United States Patent
Tu et al.

(10) Patent No.: US 12,344,247 B2
(45) Date of Patent: Jul. 1, 2025

(54) METHOD FOR CONTROLLING FOLLOWING DISTANCE BASED ON TERRAINS, TERMINAL DEVICE, AND STORAGE MEDIUM

(71) Applicant: Xiamen Yaxon Zhilian Technology Co., Ltd., Fujian (CN)

(72) Inventors: Yankai Tu, Fujian (CN); Junfang Lai, Fujian (CN); Tengyuan Luo, Fujian (CN); Xuhui Ye, Fujian (CN)

(73) Assignee: Xiamen Yaxon Zhilian Technology Co., Ltd., Fujian (CN)

( * ) Notice: Subject to any disclaimer, the term of this patent is extended or adjusted under 35 U.S.C. 154(b) by 130 days.

(21) Appl. No.: 18/254,112

(22) PCT Filed: Jul. 23, 2021

(86) PCT No.: PCT/CN2021/108048
§ 371 (c)(1),
(2) Date: May 23, 2023

(87) PCT Pub. No.: WO2022/116560
PCT Pub. Date: Jun. 9, 2022

(65) Prior Publication Data
US 2024/0001918 A1   Jan. 4, 2024

(30) Foreign Application Priority Data
Dec. 1, 2020   (CN) .......................... 202011382302.1

(51) Int. Cl.
*B60W 30/16*   (2020.01)
(52) U.S. Cl.
CPC ......... *B60W 30/16* (2013.01); *B60W 2552/15* (2020.02)

(58) Field of Classification Search
CPC .................................................. B60W 30/16
See application file for complete search history.

(56) References Cited

U.S. PATENT DOCUMENTS

| | | |
|---|---|---|
| 2018/0043793 A1 | 2/2018 | Herb et al. |
| 2020/0324766 A1* | 10/2020 | Zhao .................... B60W 30/16 |
| 2021/0213948 A1* | 7/2021 | Lahti .................. B60W 30/162 |

FOREIGN PATENT DOCUMENTS

| | | |
|---|---|---|
| CN | 104925058 A | 9/2015 |
| JP | H05294170 A | 11/1993 |

(Continued)

OTHER PUBLICATIONS

International Search Report cited in PCT/CN2021/108048 mailed Oct. 12, 2021, 6 pages.

(Continued)

*Primary Examiner* — Imran K Mustafa
(74) *Attorney, Agent, or Firm* — Cooper Legal Group, LLC

(57) ABSTRACT

The present disclosure relates to a method for controlling a following distance based on terrains, a terminal device, and a storage medium. The method includes the following steps: S1. dynamically acquiring a slope θ of a current driving road; S2. calculating a dynamic following distance d based on the slope θ; S3. determining whether d is within an acceptable following distance range [d1, d2], if d is within the range, controlling the following distance of a vehicle to be d, otherwise proceeding to step S4; and S4. if d is smaller than d1, controlling the following distance of the vehicle to be d1; and if d is greater than d2, controlling the following distance to be d2. With the method of the present disclosure, the following distance can be automatically and dynamically adjusted based on the terrains to achieve the consistency of energy saving and safety.

6 Claims, 1 Drawing Sheet

(56) References Cited

FOREIGN PATENT DOCUMENTS

| | | |
|---|---|---|
| JP | H06251300 A | 9/1994 |
| JP | 2010163058 A | 7/2010 |
| JP | 2020104678 A | 7/2020 |

OTHER PUBLICATIONS

Written Opinion cited in PCT/CN2021/108048 mailed Oct. 12, 2021, 3 pages.

* cited by examiner

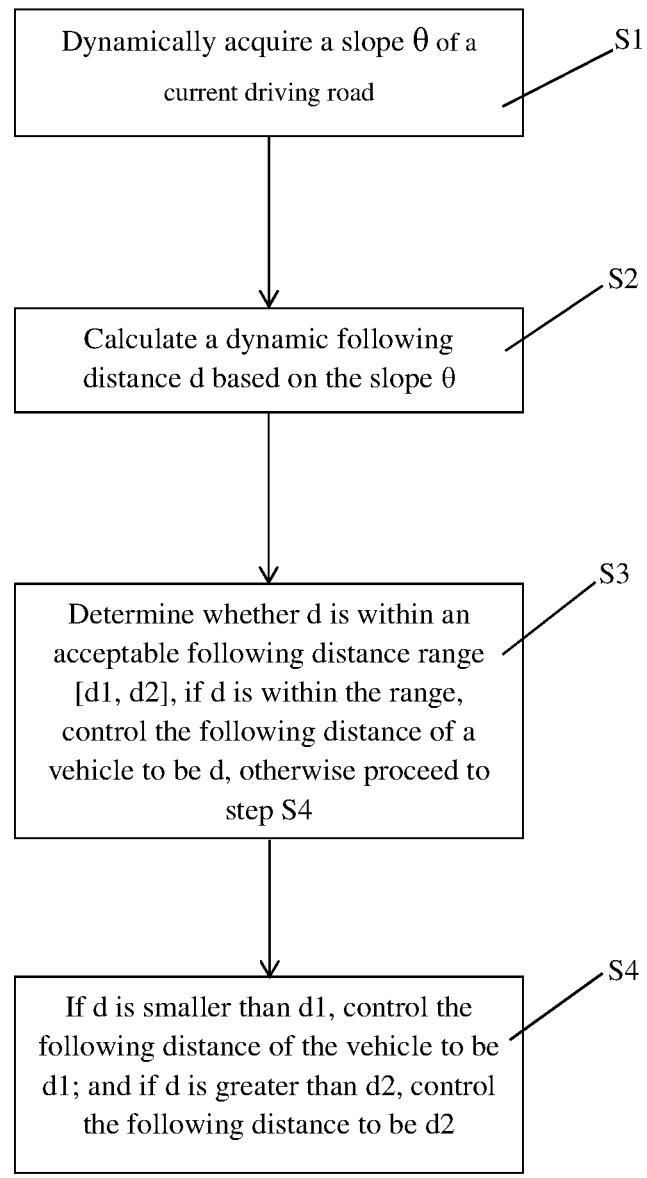

METHOD FOR CONTROLLING FOLLOWING DISTANCE BASED ON TERRAINS, TERMINAL DEVICE, AND STORAGE MEDIUM

TECHNICAL FIELD

The present disclosure relates to the technical field of vehicle distance control, in particular to a method for controlling a following distance based on terrains, a terminal device, and a storage medium.

BACKGROUND

By controlling vehicle following driving or multi-vehicle queue driving, because a vehicle ahead has a "wind-breaking" effect, the driving air resistance of a following vehicle behind is reduced, thereby having a good energy-saving effect for the vehicle behind. Existing following control is generally implemented based on adaptive cruise control (ACC), which detects a distance from the vehicle ahead by means of radar, a video, etc. and then maintains the distance during driving. In practice, selection of the distance is closely related to an energy-saving effect. When the distance is small, the wind resistance is small but a braking distance is short, so a rear-end risk may occur when the vehicle ahead brakes. Although a large distance is safe, the wind-breaking effect of the vehicle ahead is weakened, the energy-saving effect is poor, and in the actual road driving, it is easy for other vehicles to be inserted, which may require braking instead to cause energy waste. Therefore, when vehicle following is controlled by ACC, a reasonable distance range needs to be calculated.

For heavy trucks, the total mass is large, so there is a big difference in braking control in different terrains. For example, when going up a steep slope, the braking distance may be much shorter because a gravity component acts in the reverse direction of motion; while when going down a steep slope, the braking is more difficult and braking distance is longer because the gravity component is superimposed on the direction of motion, so the following distance must be different for heavy trucks in different terrains to achieve the consistency of energy saving and safety. In traditional methods, only how to control to maintain a constant following distance is generally considered, no dynamic following distance control method combined with terrains is designed for different terrains, and there is a lack of energy saving and safety performance matching the different terrains.

SUMMARY

The present disclosure aims to provide a method for controlling a following distance based on terrains, a terminal device, and a storage medium to solve the above-mentioned problems. Therefore, the specific technical solutions adopted by the present disclosure are as follows:

According to one aspect of the present disclosure, a method for controlling a following distance based on terrains is provided. The method includes the following steps:

S1. dynamically acquiring a slope $\theta$ of a current driving road;

S2. calculating a dynamic following distance d based on the slope $\theta$, specifically including:

in a case of $\theta=0$, $d=d_0$;

in a case of $\theta \neq 0$ and uphill, $$d = \frac{(b_{lsq}+d_0)(a_{lsq}C_D^0 HV_a^2)}{(b_{lsq}+d_0)21.15mg\theta + (a_{lsq}C_D^0 HV_a^2)} - b_{lsq};$$

and in a case of $\theta \neq 0$ and downhill, $$d = \frac{(b_{lsq}+d_0)(a_{lsq}C_D^0 HV_a^2)}{a_{lsq}C_D^0 HV_a^2 - 21.15mg\theta(b_{lsq}+d_0)} - b_{lsq},$$

where $d_0$ denotes a conventional ACC following distance, m denotes the total mass of the vehicle, g denotes the acceleration of gravity, $C_D^0$ denotes a wind resistance of a vehicle ahead, H denotes a windward area of a vehicle, $V_a$ denotes a windward speed, and $a_{lsq}$ and $b_{lsq}$ are empirical coefficients;

S3. determining whether d is within an acceptable following distance range [d1,d2], if d is within the range, controlling the following distance of the vehicle to be d, otherwise proceeding to S4, where d1 indicates that if the following distance is smaller than d1 at a current vehicle speed, a rear-end risk is likely to occur, and d2 indicates that if the following distance is greater than d2 at the current vehicle speed, the vehicle behind and the vehicle ahead cannot be regarded as a following state; and S4. if d is smaller than d1, controlling the following distance of the vehicle to be d1; and if d is greater than d2, controlling the following distance to be d2.

Further, the slope $\theta$ is dynamically acquired by a sensor or e-horizon system mounted on the vehicle.

Further, d2 is equal to 2 to 3 times of d1.

Further, the method further includes step S0: initializing the parameters $d_0$, d1, d2, m, $C_D^0$, H, $V_a$, $a_{lsq}$ and $b_{lsq}$.

According to another aspect of the present disclosure, a terminal device is further provided. The terminal device includes a memory, a processor, and a computer program stored on the memory and capable of running on the processor, and the processor, when executing the computer program, implements the steps of the above-mentioned method.

According to yet another aspect of the present disclosure, a computer-readable storage medium is further provided. The computer-readable storage medium has a computer program stored thereon, and the computer program, when executed by a processor, implements the steps of the above-mentioned method.

By the adoption of the above technical solutions, the present disclosure has the following beneficial effects: With the method of the present disclosure, the following distance can be automatically and dynamically adjusted based on the terrains to achieve the consistency of energy saving and safety.

BRIEF DESCRIPTION OF DRAWINGS

To further illustrate the embodiments, the present disclosure is provided with accompanying drawings. The accompanying drawings, which constitute a part of the present disclosure, are mainly intended to illustrate the embodiments, and may, together with relevant description of the specification, serve to explain the principles of operation of the embodiments. With these references in mind, a person of ordinary skill in the art will appreciate other possible implementations and advantages of the present disclosure. Elements in the FIGURE are not drawn to scale, and like reference numerals are generally used to indicate like elements.

FIG. 1 is a flow diagram of a method for controlling a following distance based on terrains according to the present disclosure.

DESCRIPTION OF EMBODIMENTS

The present disclosure will now be further illustrated with reference to the accompanying drawings and the detailed description.

It is assumed that a traditional ACC following distance range is $d_0$, a fluctuation range is [d1, d2], and $d_0 \in$ [d1, d2]. The lower limit d1 indicates that if a following distance is smaller than d1 at a current vehicle speed, a rear-end risk is likely to occur, and d1 may be obtained according to a known method for calculating a critical rear-end distance. The upper limit d2 means that if the following distance is greater than d2, a vehicle behind and a vehicle ahead may not be regarded as a following state. Generally, an empirical value is 2 to 3 times a value of d1.

According to the paper "Multi-objective Control of Heterogeneous Queues of Pure Electric Commercial Vehicles" (Wang Xuetong, Luo Yugong, Jiang Fachao, Yu Jie "Automobile Engineering", 2020, 42 (4): 505-512), following wind resistance is:

$$C_D(d) = C_D^0 \left(1 - \frac{a_{lsq}}{b_{lsq} + d}\right) \quad (1)$$

where d denotes the following distance, $C_D^0$ denotes wind resistance of the vehicle ahead, and $a_{lsq}$ and $b_{lsq}$ denote empirical coefficients and may be set as constants.

During driving on a level road, the following distance is maintained as $d = d_0$. During driving uphill, a braking distance is short because gravity applies an extra reverse braking force to the vehicle, so that the following distance is controlled to decrease. In this way, the safety is not affected, and moreover, based on formula (1), due to the decrease of the distance d, the following wind resistance is smaller, so that the energy-saving effect is improved. Assuming that an absolute value of a slope is θ, the total mass of the vehicle is m, and g is the acceleration of gravity, the following distance is calculated as follows:

It is ensured that during driving uphill, the braking performance is comparable to that of the level road, that is, the reverse force of gravity is equal to the decrease of wind resistance:

$$\Delta F_{win} = \frac{[C_D(d_0) - C_D(d)]HV_a^2}{21.15} = mg\theta \quad (2)$$

where $C_D^0(d_0)$ denotes a wind resistance coefficient of a following distance $d_0$ on the level road, $C_D^0(d)$ denotes a wind resistance coefficient of the following distance d during driving uphill, H denotes a windward area of the vehicle, and $V_a$ denotes a windward speed, including a forward speed of the vehicle and a current outside wind speed, and may be approximately equal to the vehicle speed.

By substituting formula (1) into formula (2), the following distance during driving uphill may be obtained as:

$$d = \frac{(b_{lsq} + d_0)(a_{lsq}C_D^0 HV_a^2)}{(b_{lsq} + d_0)21.15mg\theta + (a_{lsq}C_D^0 HV_a^2)} - b_{lsq} \quad (3)$$

In this case, the following distance is $d < d_0$. By decreasing the distance, the wind resistance is reduced, and the energy-saving effect is improved. Moreover, the decrease of the wind resistance cancels out the reverse gravity caused by the slope, and the braking capacity and braking distance of the vehicle are the same as on the level road, so that braking control over the vehicle in the case of the following distance d may not be excessively affected, and safety is also ensured.

Similarly, during driving downhill, since the braking distance is long, the following distance is controlled to increase, which may ensure the safety. Assuming that a downhill slope is θ, the total mass of the vehicle is m, and g is the acceleration of gravity, the following distance is calculated as follows:

It is ensured that during driving downhill, the braking performance is comparable to that of the level road, that is, the superposition of gravity on a driving force is equal to the increase of the wind resistance:

$$\Delta F_{win} = \frac{[C_D(d) - C_D(d_0)]HV_a^2}{21.15} = mg\theta,$$

where $C_D^0(d_0)$ denotes the wind resistance coefficient of the following distance $d_0$ on the level road, $C_D^0(d)$ denotes a wind resistance coefficient of the following distance d during driving downhill, H denotes the windward area of the vehicle, and Va denotes the windward speed, including the forward speed of the vehicle and the current outside wind speed, and may be approximately equal to the vehicle speed.

Therefore, the following distance during driving downhill may be obtained as:

$$d = \frac{(b_{lsq} + d_0)(a_{lsq}C_D^0 HV_a^2)}{a_{lsq}C_D^0 HV_a^2 - 21.15mg\theta(b_{lsq} + d_0)} - b_{lsq} \quad (4)$$

In this case, the following distance is $d > d_0$. By increasing the distance, the increase of the wind resistance cancels out the driving force superposed on the slope, and the braking capacity and braking distance of the vehicle are the same as on the level road, so that there is no safety problem caused by the deterioration of the braking performance during driving downhill.

In conclusion, as shown in FIG. 1, a method for controlling a following distance based on terrains according to the present disclosure may include the following steps:

S1: When a vehicle travels by following another vehicle, continuously acquire a slope θ of a current driving road from a sensor or an e-horizon system.

S2: Calculate a dynamic following distance d based on the slope θ. The step specifically includes:

in a case of θ=0, maintain the following distance to be an original distance $d_0$ of an ACC function; and in a case that the slope θ is not 0, during driving uphill, substitute the slope θ into formula (3) to calculate the dynamic following distance d, and during driving downhill, substitute the slope θ into formula (4) to calculate the dynamic following distance d.

S3: Determine whether d is within an acceptable following distance range [d1, d2], if d is within the range, control the following distance of the vehicle to be d, otherwise proceed to step S4.

S4: If d is smaller than d1, control the following distance to be d1; and if d is greater than d2, control the following distance to be d2.

In addition, the method further includes step S0: Initialize the parameters $d_0$, d1, d2, m, $C_D^0$, H, $V_a$, $a_{lsg}$, and $b_{lsq}$. That is, the parameters need to be set before the following distance is calculated. For a certain type of vehicles, the parameters $d_0$, d1, d2, $a_{lsg}$ and $b_{lsq}$ are basically unchanged, while the parameters m, $C_D^0$, H and $V_a$ are set according to actual situations.

It should be pointed out that the method of the present disclosure is more suitable for following distance control of heavy trucks and may improve energy saving efficiency while ensuring safety.

An embodiment of the present disclosure further provides a terminal device. The terminal device includes a memory, a processor, and a computer program stored on the memory and capable of running on the processor. The processor, when executing the computer program, implements steps S1-S4 of the above-mentioned method.

Further, the terminal device may be a desktop computer, a laptop, a palmtop computer, a cloud server and other computing devices. The terminal device may include, but is not limited to, a processor and a memory. A person skilled in the art may appreciate that the above composition structure of the terminal device is only an example of the terminal device and does not constitute a limitation on the terminal device. The terminal device may include more or less components than the above, or a combination of some components, or different components, for example, the terminal device may also include input and output devices, network access devices, buses, etc., which are not limited by the embodiments of the present disclosure.

Further, the processor may be a central processing unit (CPU), or other general purpose processors, digital signal processors (DSPs), application specific integrated circuits (ASICs), field-programmable gate arrays (FPGAs) or other programmable logic devices, discrete gates or transistor logic devices, discrete hardware components, etc. The general purpose processors may be a microprocessor or any regular processor, etc. The processor is a control center of the terminal device, and is connected to each part of the entire terminal device via various interfaces and lines.

The memory may be used for storing the computer programs and/or modules, and the processor implements various functions by running or executing the computer programs and/or modules stored in the memory and by invoking data stored in the memory. The memory may primarily include a program storage region and a data storage region. The program storage region may store an operating system, and applications required for at least one function. In addition, the memory may include a high-speed random access memory, or a non-volatile memory, such as a hard disk, an internal memory, a plug-in hard disk, a smart media card (SMC), a secure digital (SD) card, a Flash card, at least one disk memory device, a flash memory device, or other volatile solid-state memory devices.

An embodiment of the present disclosure further provides a computer-readable storage medium. The computer-readable storage medium has a computer program stored thereon, and the computer program, when executed by a processor, implements the steps S1-S4 of the above method according to the embodiment of the present disclosure.

The integrated modules/units of the terminal device may be stored in a computer-readable storage medium if they are implemented in the form of a software functional unit and sold or used as a stand-alone product. Based on such understanding, the present disclosure may also implement all or part of the processes in steps S1-S4 of the method in the above embodiment by instructing relevant hardware by means of a computer program. The computer program may be stored in a computer-readable storage medium, and the computer program, when executed by a processor, may implement the steps of each of the above method embodiments. The computer program includes a computer program code, and the computer program code may be in a form of source code, object code, executable file or some intermediate forms. The computer-readable medium may include: any entity or device capable of carrying the computer program code, a recording medium, a USB flash drive, a mobile hard disk drive, a diskette, a compact disk, a computer memory, a read-only memory (ROM), a random access memory (RAM), an electrical carrier signal, a telecommunication signal, and a software distribution medium, etc. It should be noted that the computer-readable medium may contain content which is subject to appropriate additions and subtractions as required by legislation and patent practice in jurisdictions, for example, in some jurisdictions, the computer-readable medium does not include the electrical carrier signal or the telecommunication signal in accordance with legislation and patent practice.

While the present disclosure has been particularly illustrated and described with references to the preferred embodiments, it will be understood by a person skilled in the art that all changes in form and details made to the present disclosure without departing from the spirit and scope of the present disclosure as defined by the appended claims fall within the protection scope of the present disclosure.

The invention claimed is:

1. A method for controlling a following distance based on terrains, comprising the following steps:

S1. dynamically acquiring a slope $\theta$ of a current driving road;

S2. calculating a dynamic following distance d based on the slope $\theta$;

S3. determining whether the dynamic following distance d is within an acceptable following distance range [d1,d2], when the dynamic following distance d is within the acceptable following distance range [d1,d2], controlling a following distance of a vehicle to be the dynamic following distance d, otherwise proceeding to step S4, wherein d1 indicates that when the following distance is smaller than d1 at a current vehicle speed, a rear-end risk is likely to occur, and d2 indicates that when the following distance is greater than d2 at the current vehicle speed, a vehicle behind and a vehicle ahead cannot be regarded as a following state; and S4. when the dynamic following distance d is smaller than d1, controlling the following distance of the vehicle to be d1; and when d is greater than d2, controlling the following distance to be d2;

wherein the calculating a dynamic following distance d based on the slope $\theta$ comprises:

in a case of $\theta=0$, $d=d_0$;

in a case of $\theta \neq 0$ and uphill, $$d = \frac{(b_{lsq} + d_0)(a_{lsq}C_D^0 H V_a^2)}{(b_{lsq} + d_0)21.15 mg\,\theta + (a_{lsq}C_D^0 H V_a^2)} - b_{lsq};$$

and in a case of θ≠0 and downhill, $$d = \frac{(b_{lsq} + d_0)(a_{lsq} C_D^0 H V_a^2)}{a_{lsq} C_D^0 H V_a^2 - 21.15 mg\, \theta (b_{lsq} + d_0)} - b_{lsq}, \qquad 5$$

wherein do denotes an adaptive cruise control (ACC) following distance, m denotes a total mass of the vehicle, g denotes an acceleration of gravity, $C_D^0$ denotes a wind resistance of the vehicle ahead, H denotes a windward area of the vehicle, $V_a$ denotes a windward speed, and $a_{lsq}$ and $b_{lsq}$ are empirical coefficients.

2. The method according to claim 1, wherein the slope θ is dynamically acquired by a sensor or e-horizon system mounted on the vehicle.

3. The method according to claim 1, wherein d2 is equal to 2 to 3 times d1.

4. The method according to claim 1, further comprising the following step
S0. initializing the parameters d0, d1, d2, m, $C_D^0$, H, Va, $a_{lsq}$, and $b_{lsq}$.

5. A terminal device, comprising a memory, a processor, and a computer program stored on the memory and configured to run on the processor, wherein the processor, when executing the computer program, implements the steps of the method according to claim 1.

6. A non-transitory computer-readable storage medium having a computer program stored thereon, wherein the computer program, when executed by a processor, implements the steps of the method according to claim 1.

* * * * *